United States Patent Office 3,353,787
Patented Nov. 21, 1967

3,353,787
USEFUL POWER FROM OCEAN WAVES
Marcel S. Semo, 59 Linden St.,
Allston, Mass. 02134
Filed July 11, 1966, Ser. No. 564,127
4 Claims. (Cl. 253—4)

ABSTRACT OF THE DISCLOSURE

An apparatus for harnessing the energy of sea or ocean waves wherein elongated tubes with flexible top surfaces are arranged parallel to the crest line of the waves. The moving wave presses down on a tube which in turn displaces an incompressible fluid such as water into a tide energy accumulator and a fluid motor. The tubes are interconnected so that a substantial fraction of the wave energy of a single wave is combined and concentrated.

---

This invention relates to a method and apparatus for producing useful power from the energy of ocean waves.

Attempts have been made in the past to harness the motion and energy of ocean waves so as to derive useful power. Thus, in 1913 Hemmenway, U.S. Patent 1,082,746 described a wave motor comprising a rotatable cylinder rolling up on a cable by the action of the wind, tide or waves. Hulden in 1917, U.S. Patent 1,123,104 described a similar reciprocating and oscillatory movement.

In the succeeding years other devices were proposed in U.S. patents to harness the rising and falling motion of waves with floats and similar devices. Webb in 1923, 1,454,801, used a buoyant globe and counterbalancing mechanism. Hegge in 1928, 1,667,152, utilized the vertical motion of floats attached to shafts and gearing as did Quinte in 1941, 2,242,598.

Since World War II other devices have been described for obtaining power from the movement of marine waves. However, almost all of these developements have likewise depended upon translating the wave-induced vertical motion of a float, buoy or pontoon, by means of gearing or other mechanical actions. Examples of such devices include the following U.S. patents:

Smurr, 2,613,868 (1952); Searcy, 2,707,077 (1955); Searcy, 2,749,085 (1956); 2,757,899 (1956); and Salzer, 2,783,022 (1957).

In a slightly different variation, Caloia, 2,848,189 (1958) used a plurality of floats to actuate water pumps, while Corbett, 3,064,137 (1962) used the rising liquid to compress air in a buoy. Masuda, 3,200,255 and 3,204,110 (1965) utilized the vertical motion of a buoy to compress air and rocking action to get mechanical output.

Since these previously described devices utilize the vertical surface motion of the ocean waves, they are not only cumbersome and complex but are subject to the ravages of severe storms and tidal waves. In addition, surface motion represents only a small fraction of the available energy of ocean waves near a shoreline. The profiles of ocean waves in deep water are long and low. When the waves enter shallow water, there is a decrease in length and velocity and an increase in height. Near the breaker zone, the breaking waves may attain a height several times greater than the deep water wave. This effect is generally uniform along the coast. Also, it has been recently computed that in water 20 feet deep at the point of breakers, there is *45 horsepower per foot* of seawave front, with a wave height of about 11½ feet. A 4 foot wave in seawater 30 feet deep would have about *5.5 horsepower per foot* of front. This constitutes kinetic and potential energy of *28,000 horsepower per mile* of front for a very moderate and common wave condition.

One object of the present invention is to provide useful power from ocean waves by simple sturdy means needing little or no attention for continuous operation.

A further object of this invention is to provide such an apparatus which can be readily used to generate electricity or supply mechanical motive power.

Another object of this invention is to provide such an apparatus which will be relatively unaffected by changes in atmospheric and climatic conditions and which is inexpensive to manufacture and maintain.

A further object of this invention is to provide such an apparatus which will harness a far greater proportion of wave energy than has hitherto been done so as to provide economical power for important operations such as desalinization of seawater.

Further objects and advantages of this invention will be apparent from the description and claims which follow and from the appended drawings in which:

Figure 1:
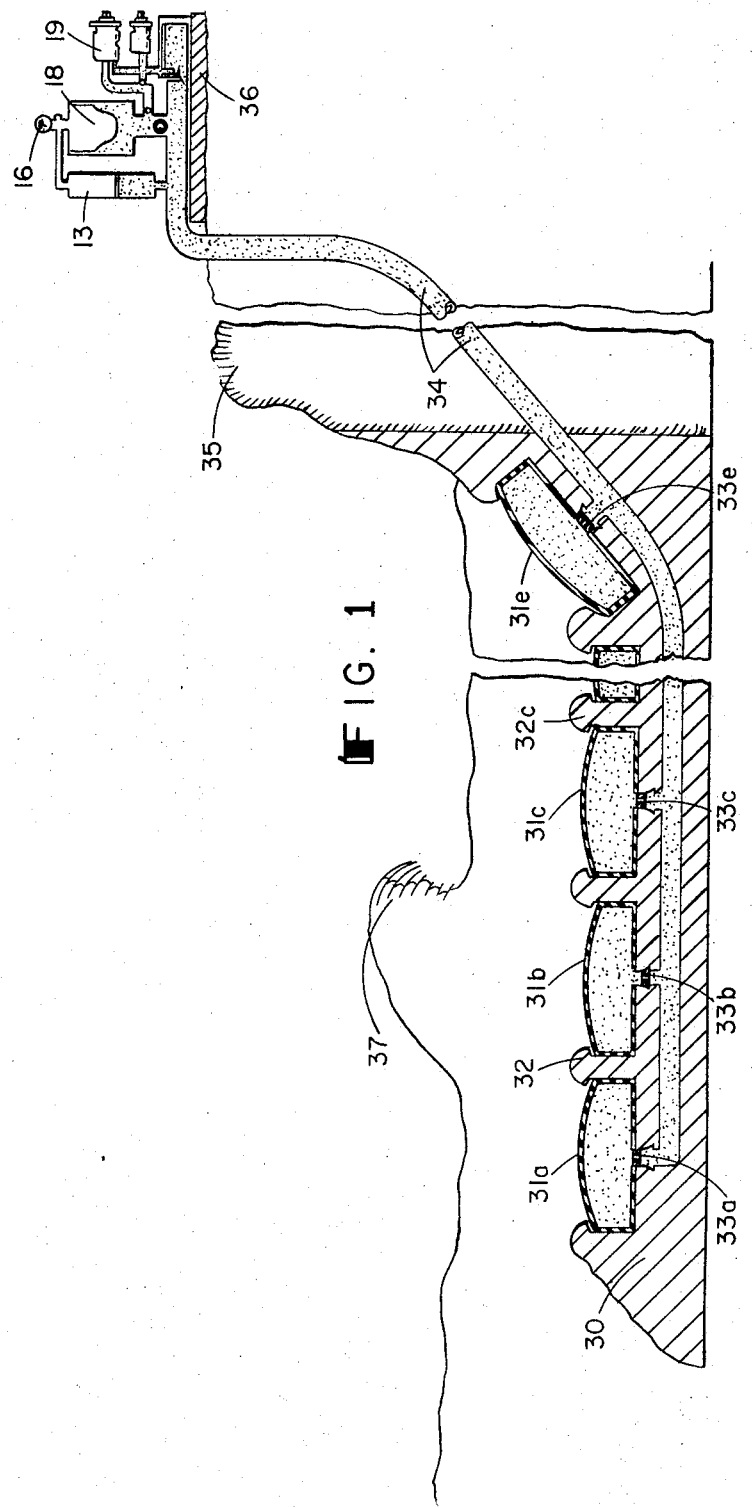
FIG. 1 is a side sectional view illustrating the flow of the system.
Figure 2:
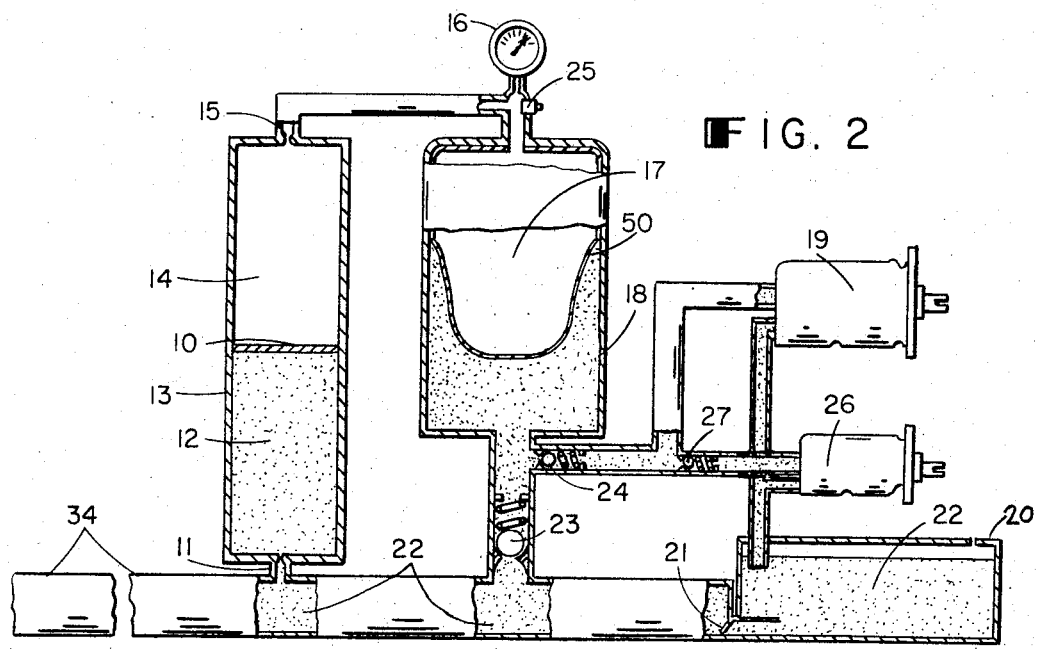
FIG. 2 is an enlarged cross section of the power storage and conversion portion.
Figure 3:
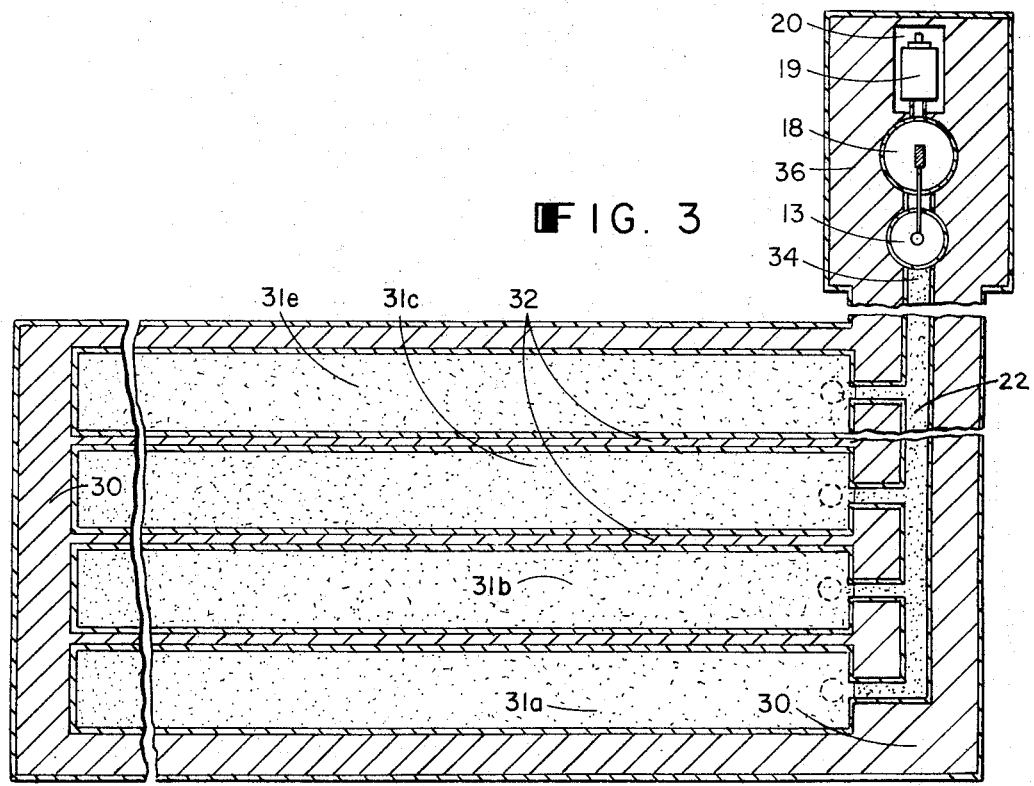
FIG. 3 is a plan view.

The invention comprises generally a plurality of elongated tubes spaced one behind the other adjacent the floor of the ocean near the shoreline and parallel to the wavefront. Each tube has a flexible upper surface, is closed at its ends and has a bottom conduit leading to a collecting conduit which in turn leads to a fluid motor means. The tubes conduit and fluid motor means comprise an essentially closed system containing an incompressible or hydraulic fluid such as water or oil. As an ocean wave passes over each elongated, compressible tube, pressure is exerted on the flexible upper surface so as to cause the fluid in the closed system to be pushed into the fluid motor. The outlet conduit for each tube has valve means permitting rapid outflow and slow return flow. Sufficient compressible tubes are provided so as to average the effect of the waves, thus producing a substantially smooth flow of water into the collecting conduit.

In the embodiment illustrated in the drawings, a plurality of elongated rubber tubes 31a, b, c and e are shown positioned in the ocean near the shore, with 31a, b and c being horizontal while 31e is at an angle with the horizontal. Each tube is housed in a separate recess in concrete frame 32 so that only its upper surface is exposed. Each has a bottom conduit with floating one-way outlet valves 33a, b, c and e which are provided with small holes in their centers to permit the return of fluid. All these bottom conduits connect to a single collecting conduit 34 which in turn connects to a shore installation 36 rising above the shoreline 35.

The illustrated shore installation comprises a tide height accumulator 13, a wave energy accumulator 18 and a fluid motor means 19. The hydraulic fluid 22 fills the tubes and portions of the shore installation, as explained below, so as to form a closed system. An auxiliary fluid motor 26 is also provided. The hydraulic fluid 22 under pressure rises in collecting conduit 34, and enters through a constricted passage 11 so as to apply pressure on a sliding diaphragm 10 in the tide height accumulator 13. The fluid 22 also passes through a one-way low-pressure spring valve 23 into wave energy accumulator 18. Fluid in accumulator 22 can pass through one-way high-pressure valve 24 into fluid motor 19, from which it is permitted to return to the hydraulic fluid reservoir 20, and then by one-way valve 21 to conduit 34.

The fluid portion 12 below the sliding diaphragm 10 in the tide height accumulator 13 acts to compress air 14. This compressed air 14 acts through a restriction 15 on the upper pressurized air section 17 of the wave energy accumulator 18 which is separated from the hydraulic fluid by a bag-like flexible membrane 50. The combination of accumulators provides a means of adjusting or equalizing the fluid pressure available at valve 24 for the fluid motor 19 as the tides rise and fall. Thus, at high tide the level of fluid 12 rises, causing diaphragm 10 to rise, compressing further the air 14. This applies greater pressure on air section 17 and hence the fluid below it. At low tide more fluid enters wave energy accumulator 18 before the threshhold pressure is reached for passing out through valve 24, and less fluid enters into tide height accumulator 13. For proper balance of air pressure with fluid pressure, valve 25 is provided which acts as a means of supplying or removing air and also as an emergency relief. An air gage 16 is provided.

Tubes 31a, b, c and e can be made of flexible materials other than rubber, as for example, rubberized nylon fabric. Since the compressible elongated tubes are substantially parallel to the seashore, they remain stationary when a wave comes over them. The dimensions of these compressible tubes is variable. In general, the width of the incoming wave should be substantially smaller than the combined width of the compressible tubes. The interconnection of the bottom conduits permits the varying hydrostatic pressures to be transmitted to the accumulator. By means of the buoyancy valves 33a, b, c and e, a valve will open only on that particular tube which has a greater pressure than the other tubes, due to the weight of the wave coming over it. Thus, there is selected transmission of pressure to the hydraulic energy conversion unit.

The accumulator 18 transforms the hydraulic pressure into pneumatic pressure and stores it until the pressure exceeds a minimum working pressure. Valve 24 releases when this pressure is reached so that the compressed air 17 causes the hydraulic fluid to actuate the fluid motor 19. An additional fluid motor 26 is provided actuated by a high pressure valve 27 for extremely high wave activity such as might be occasioned by severe storms or tidal waves. This also has a return to reservoir 20.

The variation of tide height and hydrostatic pressure is averaged by means of the tide height accumulator 13. The water level gages the height of the tide, but the variation in wave pressures will be attenuated by the narrowness of gap 11. As the tide height changes, the level changes so that the air above the diaphragm 10 becomes compressed. This in turn transmits air pressure to the air section of the wave energy accumulator, thus causing the latter to reach the minimum motor pressure more readily. The primary valve 23 is thus kept in continuous operating condition irrespective of the tide height.

The fluid motor which can be used with this invention can be varied according to the desired use of the output. It is a generally accepted belief that hydraulic motors should be operated at a high speed for maximum efficiency. However, hydraulic motors have been described which provide a high torque at low speed for constant and variable speed drives. It is obvious that the hydraulic motor selected can be adapted for operating a mechanical device or a generator to supply electric power.

Although only one form of the invention has been illustrated and described, it is to be understood that various changes and modifications may be made therein without departing from the spirit of this invention, the scope of which is set forth in the appended claims.

I claim:
1. An apparatus for utilizing the energy of sea or ocean waves comprising:
    (a) a plurality of elongated tubes spaced substantially parallel to the crest line of the waves and below the surface of the water; each said tube being closed at its ends and having a flexible exposed surface;
    (b) conduit means extending from each said tube to a common conduit;
    (c) valve means for each tube permitting ready flow of fluid into said common conduit but relatively slow backflow into said tube;
    (d) said common conduit leading to the bottoms of two vessels; one said vessel having means separating incompressible fluid below from air above; said second vessel having means separating incompressible fluid below from air above; the air in said vessels being interconnected; said second vessel having a one-way inlet valve from the conduit and a one-way outlet valve; said first vessel means applying pressure on the air in response to the height of the tide; said second vessel means applying pressure on said air in response to the wave energy;
    (e) fluid motor means connected to said one-way outlet valve and including a reservoir of incompressible fluid which has a one-way return valve to said conduit means;
    (f) incompressible fluid filling said tubes and conduits and operable on said fluid motor means when pressure is applied to any of said flexible surfaces.
2. The apparatus of claim 1 wherein said tubes comprise flexible materials housed in a rigid frame.
3. The apparatus of claim 1 wherein said tube valve comprises a buoyant valve with a small opening.
4. The apparatus of claim 1 wherein said first vessel means comprises a sliding transverse diaphragm and said second vessel means comprises a fixed transverse flexible membrane.

References Cited

FOREIGN PATENTS 1,336,832   7/1963   France.

EVERETTE A. POWELL, Jr., *Primary Examiner.*

MARTIN P. SCHWADRON, *Examiner.*